United States Patent [19]
Dean

[11] Patent Number: 5,991,820
[45] Date of Patent: Nov. 23, 1999

[54] METHOD FOR OPERATING MULTIPLE PROCESSES USING MESSAGE PASSING AND SHARED MEMORY

[75] Inventor: Edward A. Dean, Westford, Mass.

[73] Assignee: Sun Microsystems, Inc., Mountain View, Calif.

[21] Appl. No.: 08/121,951

[22] Filed: Sep. 15, 1993

Related U.S. Application Data

[63] Continuation of application No. 07/628,342, Dec. 14, 1990, abandoned.

[51] Int. Cl.$^6$ ........................................................ G06F 9/40
[52] U.S. Cl. .................................. 709/300; 709/8; 709/1
[58] Field of Search ............................ 395/800; 709/300, 709/1, 8

[56] References Cited

U.S. PATENT DOCUMENTS

| | | | |
|---|---|---|---|
| 4,761,642 | 8/1988 | Huntzinger | 340/721 |
| 4,914,653 | 4/1990 | Bishop | 370/85.6 |
| 5,060,150 | 10/1991 | Simor | 364/200 |
| 5,062,060 | 10/1991 | Kolnick | 364/521 |
| 5,095,421 | 3/1992 | Freund | 395/650 |
| 5,133,053 | 7/1992 | Johnson | 395/200 |

FOREIGN PATENT DOCUMENTS

| | | | |
|---|---|---|---|
| 02 250 157 | 10/1987 | European Pat. Off. | G09G 1/00 |

OTHER PUBLICATIONS

Real–time Processing Comes to UNIX, by Syd Shapiro, Computer Design, Aug. 1, 1989, vol. 28. No. 15 p. 97.
Scheduling In Real Time. (UNIX Operating System), by Lock, Douglass C., UNIX Review, Sep. 1990, vol. 8, No. 9, p. 48 (7).

Patent Abstracts of Japan, vol. 012, No. 303 (P–746) Aug. 18, 1988 and JP–A–63 075 937 (Fujitsu Ltd.) Apr. 6, 1988 [Abstract].

D.L. Ripps, "The Multitasking Mindset Meets the Operating System", *EDN Electrical Design News,* vol. 35, No. 20, Oct. 1, 1990, Newton, MA, pp. 115–123.

*Primary Examiner*—Eric Coleman
*Attorney, Agent, or Firm*—Blakely Sokoloff Taylor & Zafman

[57] ABSTRACT

In the system of the present invention, a time critical program operating in a window system environment is implemented. The application program containing time critical procedures is divided functionally into two or more processes. The first process contains all of the CPU time slice sensitive or time critical procedures. This process operates independently of the window system interface and communicates directly with the operating system. The second process implements all procedures which require the user input and output through the window system but not including time critical procedures. This process communicates with and operates through the window system interface. The processes exchange data and synchronize execution through the interprocess communication mechanisms such as shared memory such that the two or more processes operate and appear as a single process to the user while insulating the first process from suspension due to window system operations and blocking procedures.

16 Claims, 7 Drawing Sheets

METHOD FOR OPERATING MULTIPLE PROCESSES USING MESSAGE PASSING AND SHARED MEMORY

This is a file wrapper continuation application of U.S. patent aplication Ser. No. 07/628,342, filed on Dec. 14, 1990, now abandoned entitled "Method for Operating Time Critical Processes in a Window System Environment".

BACKGROUND OF THE INVENTION

1. Field of the Invention

The present invention relates to the execution of time critical processes in a computing environment. More particularly, the present invention relates to a method and apparatus for executing time critical processes in a window system environment.

2. Art Background

In the computing industry it is quite common to utilize a window system such as the SunView™ or NeWS™ XVIEW™ (OPEN WINDOWS™) window systems (SunView™, XVIEW™, OPEN WINDOWS™ and NeWS™ are trademarks of, and are manufactured by, Sun Microsystems, Inc., Mountain View, Calif.), for displaying and controlling user input and output to an application program. The window system provides the means to generate visual user interfaces such as menus and other graphical objects. Multiple application programs can be shown and executed at the same time using windowed displays. For example, in a first window an accounting program may be operating, while in a second window a drawing program may be running. The user of the computer has the ability to switch from window to window to operate the separate programs by moving the cursor from one window to another. Furthermore, the window system controls the information displayed, the processes executing through the window system and the user input to various windows and executing processes.

The window system maintains complete control over the programs which are executing through the window system (hereinafter referred to as "application programs"). For example, the window system controls the access to hardware output devices such as video displays, printers, etc. The application programs depend upon the window system to notify the application programs of user window events. Furthermore, the window system controls the application programs such that different application programs can operate in a multi-tasking environment. In addition, the window system controls which processes of the application programs may access the CPU and the priority of access.

Typically, in a multi-tasking computing environment, each process executing is allocated a "time slice" (i.e., a predetermined period of time) to utilize the CPU. The processes execute during their respective time slices, thereby sharing the CPU. If a process has not completed execution during its time slice, the process "goes to sleep" (i.e., the process is suspended) until its next time slice. Furthermore if a user event is considered to be a blocking operation, for example, reading data from a disk, the corresponding process will be suspended until the operation is complete.

In a window system environment, the window system has the ability to intervene in the allocation of time slices and therefore can cause processes to be suspended. Hence, processes of application programs, which operate through the window system are not guaranteed access to the CPU within a predetermined amount of time because the process can be suspended for an indeterminate amount of time by the window system.

For example, the window system may need to modify the CPU time slice process allocation to perform generic window system operations such as moving a window or displaying graphics or text. Generally, this is not a problem for an application process executing through the window system. More particularly, suspension of the application process will not cause any problems except for a slight delay in the execution of the process. For example, when a user enters an unknown command, the window system displays an error message and requires the user to enter "ok" or similar acknowledgement command to proceed. While the window process waits for the user to respond, it freezes or suspends all other window processes currently executing under the window system. [For information on window systems, see, for example, Gosling, Rosenthal, Arden, *The NeWS Book* (1989) pp. 23–52].

The suspension of processes by the window system because of blocking operations and the like creates a problem in time critical processes of application programs executing through the window system. These time critical processes require responses and actions to be taken within specific time frames. For example, if an application program is receiving data through a modem, then the modem must receive the data to be transmitted at a certain baud rate which dictates a certain time dependency. If the time critical application program is suspended by the window system, then the modem cannot receive the data at the utilized baud rate, and the modem cannot operate properly. More particularly, if the modem is connected to a Unix® base system (Unix is a registered trademark of AT&T), while the time critical application program is currently accessing the modem to receive data and the time critical application program is suspended by the window system, the data received through the modem will go to a buffer located in the operating system kernel. The operating system will then attempt to transfer the information received from the modem to the application program. However, if the application program is suspended, the data cannot be transferred and the data will remain in the buffer. If the suspension continues, the buffer eventually becomes full and the data is lost due to a serial overrun. [For further information on the Unix system and Unix kernel, see Bach, *The Design of the Unix Operating System* (1986)].

This problem may be avoided by modifying the window system to not suspend time critical processes. However, most window systems are standardized such that the window system cannot be changed and all application programs written to operate in conjunction with the window system must adhere to the strict window system interface.

SUMMARY OF THE INVENTION

It is therefore an object of the present invention to allow the time critical application programs executing under a window system to share the CPU and execute during their respective time slices without modifying the window system, and without violating the window system interface.

It is an object of the present invention to allow time critical applications programs which include blocking operations to utilize the CPU in a timely fashion without being blocked by the blocking operations.

The time critical application program is divided functionally into at least two processes. The first process contains all of the CPU time slice sensitive or time critical procedures. This process operates independently of the window system interface and communicates directly with the operating system. The second process implements all remaining procedures including blocking operations as well as those procedures which require the user input and output through the window system but not including time critical procedures. This process typically communicates with and operates through the window system interface. The two or more processes exchange data and synchronize execution through the interprocess communication mechanisms such as shared memory such that the two or more processes operate and appear as a single program to the user.

BRIEF DESCRIPTION OF THE DRAWINGS

The objects, features and advantages of the present invention will be apparent from the following description of the invention in which.

NOTATION AND NOMENCLATURE

The detailed descriptions which follow are presented largely in terms of algorithms and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signal as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention. In the present case, the operations are machine operations. Useful machines for performing the operations of the present invention include general purpose digital computers or other similar devices. In all cases there should be borne in mind the distinction between the method of operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below.

DETAILED DESCRIPTION OF THE INVENTIONS

General System Configuration

Figure 1:
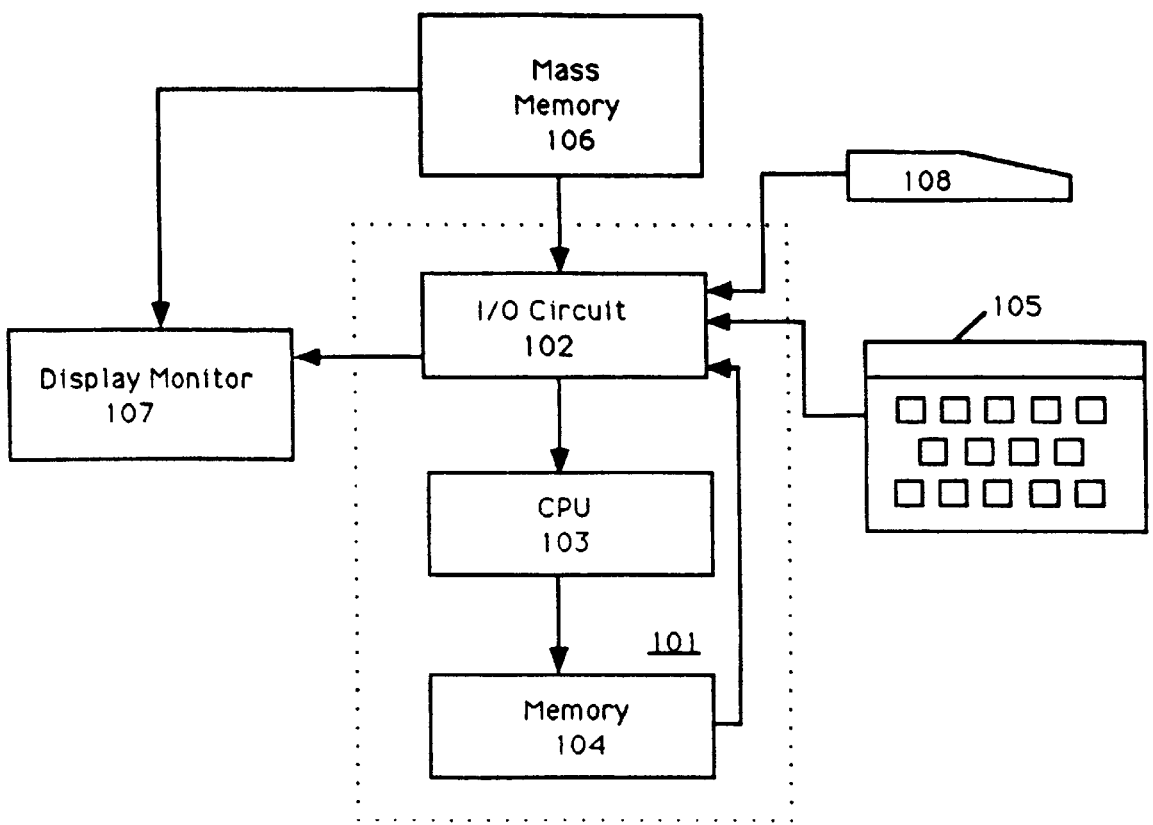
FIG. 1 is a block diagram representation of a typical computer system for execution of time critical programs according to a preferred embodiment of the present invention.

FIG. 1 shows a typical computer-based system for executing time critical processes in a window system environment according to the present invention. Shown there is a computer 101 which comprises three major components. The first of these is the input/output (I/O) circuit 102 which is used to communicate information in appropriately structured form to and from the other parts of the computer 101. Also shown as a part of computer 101 is the central processing unit (CPU) 103 and memory 104. These latter two elements are those typically found in most general purpose computers and almost all special purpose computers. In fact, the several elements contained within computer 101 are intended to be representative of this broad category of data processors. Particular examples of suitable data processors to fill the role of computer 101 include machines manufactured by Sun Microsystems, Inc., Mountain View, Calif. Other computers having like capabilities may of course be adapted in a straightforward manner to perform the functions described below.

Also shown in FIG. 1 is an input device 105, shown in typical embodiment as a keyboard. It should be understood, however, that the input device may actually be a card reader, magnetic or paper tape reader, or other well-known input device (including, of course, another computer). A mass memory device 106 is coupled to the I/O circuit 102 and provides additional storage capability for the computer 101. The mass memory may include other programs and the like and may take the form of a magnetic or paper tape reader or other well known device. It will be appreciated that the data retained within mass memory 106, may, in appropriate cases, be incorporated in standard fashion into computer 101 as part of memory 104.

In addition, a display monitor 107 is illustrated which is used to display messages or other communications to the user. Such a display monitor may take the form of any of several well-known varieties of CRT plasma and LCD displays. A cursor control 108 is used to select command modes and edit the input data, and in general provides a more convenient means to input information into the system.

Process Description

The following description of the preferred embodiment of the present invention describes a method for operating time critical programs in a window system environment. Specifically, the implementation of the method for operating time critical programs of the present invention is described with respect to a distributed window system environment (also referred to herein as a "server-based system"). However, it will be apparent to one skilled in the art from reading the following detailed description that the method for operating time critical processes may be applied to different computer systems having different computer architectures and different window systems. Furthermore, the following description discusses a method for operating time critical programs in a window system environment operating in the Unix operating system. However, the system is not limited as such and may be implemented in any multi-tasking or multi-processor operating system.

A window system generally divides the screen into multiple overlapping or non-overlapping visual regions referred to as windows. A different application program may execute in each window. A window is a visible part of the screen which is used for displaying information with respect to the application programs operating within the window and provides the means for the user to interact with the application program executing within the particular window. The window system acts as an interface between the application program and the operating system for most operations, particularly user input and output, thereby controlling the application program's access to the operating system. The window system also provides the application programs with procedures to specify the size and location of the windows, to draw on the windows and to customize the appearance of menus.

Figure 2:
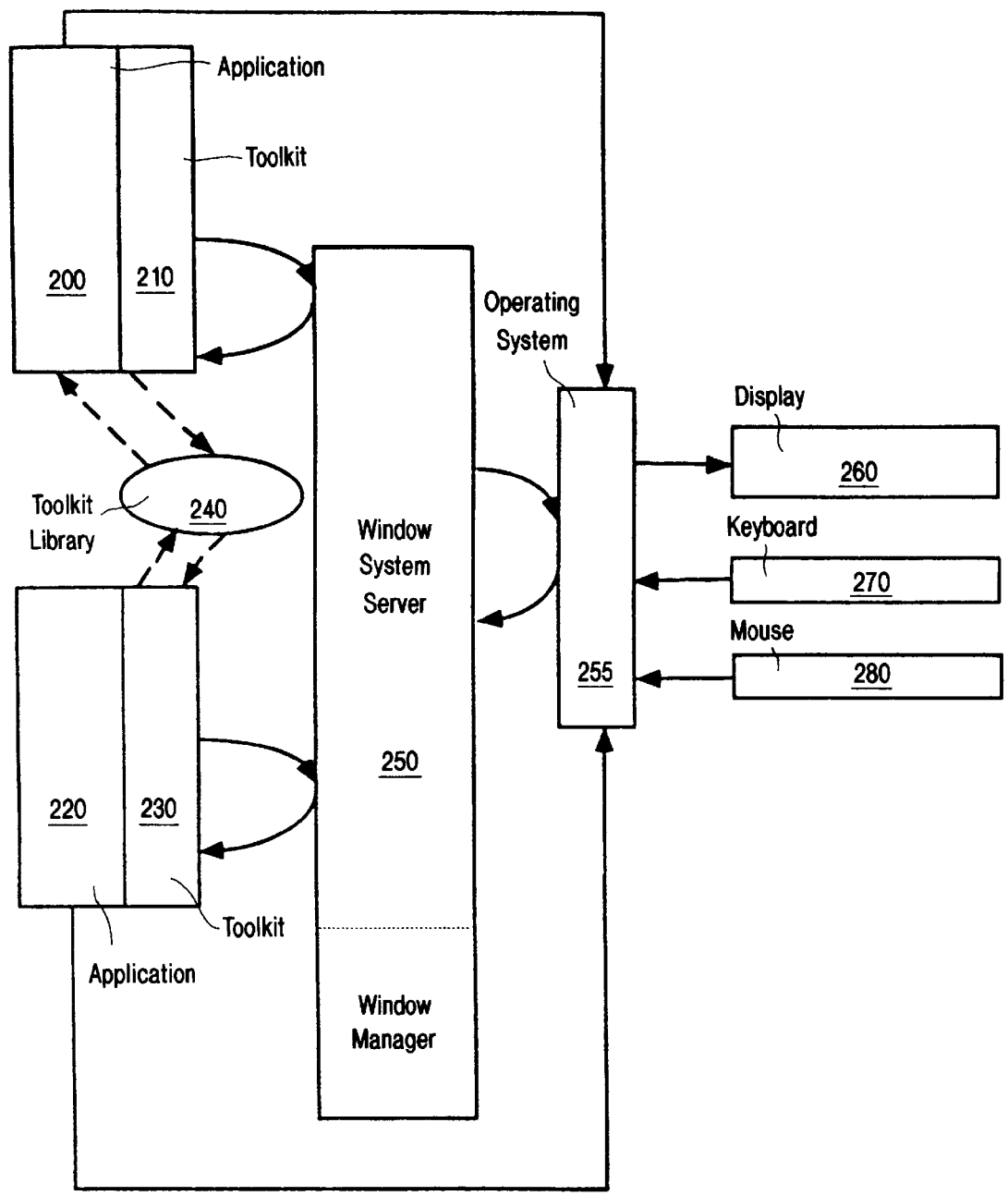
FIG. 2 is a block diagram representation of an illustrative server based window system.

As illustrated in FIG. 2, the display 260, keyboard 270 and mouse 280 provide input/output to the window system and the application programs operating through the window system via the operating system 255. The server-based window system consists of a number of processes referred to as a window server, window manager and toolkit.

The window server 250 controls the display and the priority of access of the application programs to the display. Examples of the window server include the X11™ (X11 is a trademark of Massachusetts Institute of Technology) which supports the X11 protocol [see, Sheifler, Gettys, "The X Window System", *ACM Transaction on Graphics,* Vol. 5, No. 2, April 1986, pgs. 79–109], and X11/NeWs, window server protocols [see, Sheaufler, "X11/NeWs Design Overview", *Proceedings of the Summer* 1988 *User Conference* (1988), pgs. 23–35].

The window manager controls the work space of the window that occupies the screen and determines the work space of menu window and icon placement. The window manager may be a separate process, as is typically the case with the X11 protocol, or it may be part of a window server, as is the case with respect to the X11/NeWs window system where the window manager is a collection of processes that reside in the window server.

The toolkit 210, 230 determines how the window systems menu appear, how the user interacts with the control areas, and how the control areas are organized. The toolkit 210, 230 preferably includes a toolkit library 240 consisting of a library of functions which the toolkit references to interface the application program to the window system. The application programs communicate and operate within the window system through the processes available in the toolkit and the toolkit library. An example of the toolkit and the toolkit library is the X View™ toolkit (X View is a trademark of Sun Microsystems, Inc., available from Sun Microsystems, Inc., which is used in X11/NeWs window system). For further information regarding the X View toolkit, see Jacobs, "The X View Toolkit, Architectural Overview", 3rd Annual Technical Conference, 1989.

Figure 3:
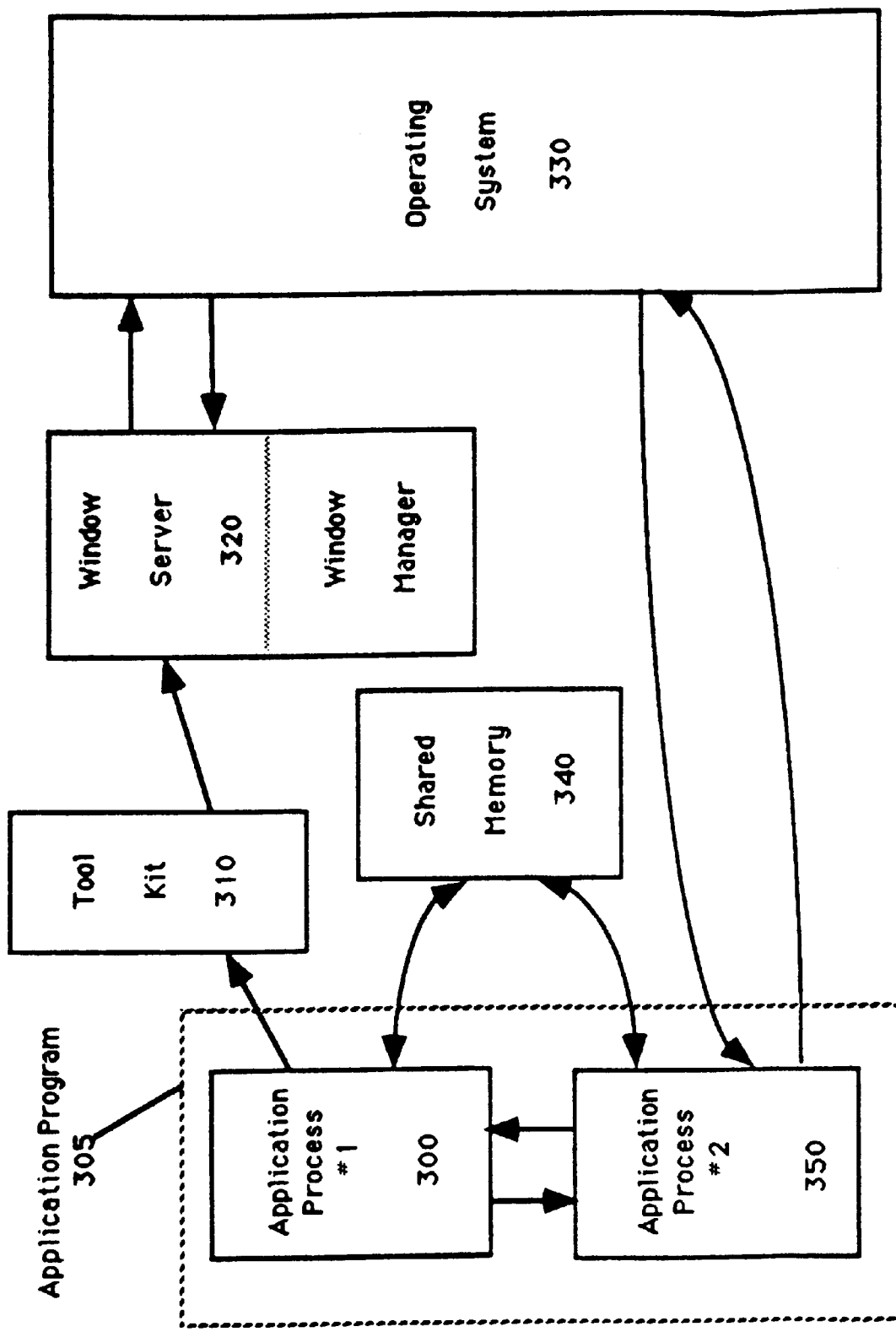
FIG. 3 is a block diagram representation of a method for operating time critical programs in a window system environment

In the method of the present invention for operating a time critical application program in a window system environment, the application program is divided functionally into two or more processes wherein one process contains time critical procedures. Time critical procedures are those which require responses and actions to be taken within a predetermined amount of time. Referring to FIG. 3, application program 305 is divided in a first process 300 and second process 350.

The first process 350 includes procedures of the application program which contain procedures and commands that are time critical in that the processes require a predetermined response time in order to execute properly. This problem arises when emulating hardware in software because hardware devices are intrinsically real time with little or no delay in operation. Furthermore, software emulation of system service routines such as interrupts must operate in a timely manner. Thus, examples of time critical application processes include but not limited to input/output emulation procedures, such as emulation of disk drive controllers, interrupt controllers, keyboard controllers, serial I/O interfaces and clock emulators as well as other processes which emulate hardware. The first process 350 does not operate through the window system but instead communicates directly to the operating system 330. The first process bypasses the window system, and therefore is not controlled by the window system and cannot be suspended by the window system for any periods of time. Furthermore, by placing blocking procedures in other processes, suspension of the time critical procedures due to blocking operations is avoided.

The second process 300 implements those procedures which require interaction with the window system but are not time critical as well as blocking procedures which, when executed, cause the program/process to be suspended. Examples of window system procedures include procedures for displaying data onto a discrete portion of the screen, or resizing a particular window. The second process 300 is linked with a toolkit 310 which provides the application's menus, control areas and drawing capabilities. The window server 320 controls the display and the access to the display of the application programs. Hence, the first process is subjected to the requirements and restrictions of the window system. Blocking procedures are those procedures, such as read from disk or other file operations, which take a significant amount of time to execute and when executed cause the program to be suspended by the operating system until execution of the blocking operation is complete.

The application may also be separated into additional sub-programs to minimize the effect of blocking processes on the application. Additional processes may be created, each process containing one or more blocking procedures. Preferably, in a UNIX operating system environment, each process contains only one blocking procedure to take advantage of the UNIX operating system capability to permit a program to continue executing when a single blocking procedure is encountered. (However, the program/process will be blocked if more than one blocking procedure is to be executed). Thus the first process is not affected by procedures which can cause the application to be suspended.

Although the application program is divided into two or more processes, the processes operate in conjunction with one another and appear as a single program to the user. This is achieved through interprocess communication and/or shared memory.

An example of an interprocess communication capability is discussed with reference to FIG. 4. However, it is evident to one skilled in the art that other interprocesses communication facilities may be used. Furthermore, the following discussion describes interprocess communication between two or more processes. However, as noted above, the present invention is not limited to two processes and can also be implemented with three or more processes to be representative of an application program.

Figure 4:
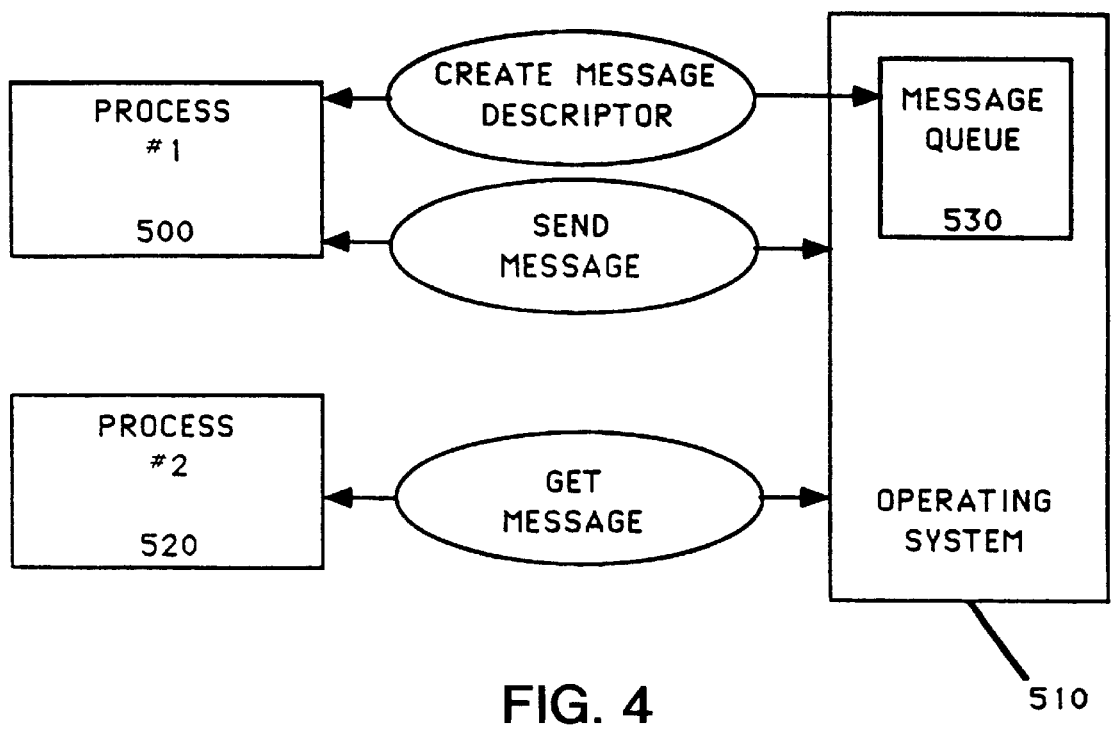
FIG. 4 is a block diagram representation of one process communicating with another process via messages.

Referring to FIG. 4, in a UNIX-based system processes may communicate with other processes by using the message mechanism, which is provided in the UNIX System V IPC package. The operating system 510 maintains a message queue 530 in which interprocess messages are stored. To communicate, the first process 500 sends a MSGGET (MSGCREATE) system call to create a message description which designates a message queue 530. The operating system 510 allocates a queue structure and returns an identifier to the first process 500. The first process 500 then executes a MSGSND system call to send a message. The operating system 510 checks whether the first process 500 has permission to write according to the message description. If the first process 500 has permission, the operating system 510 puts the message on the message queue. The second process 520 receives its message sent from the first process from the message queue 530 in the operating system 510 by executing a MSGGET system call. For further information on the Unix system, see Bach, *The Design of the Unix Operating System* (Prentice-Hall1986).

Figure 5:
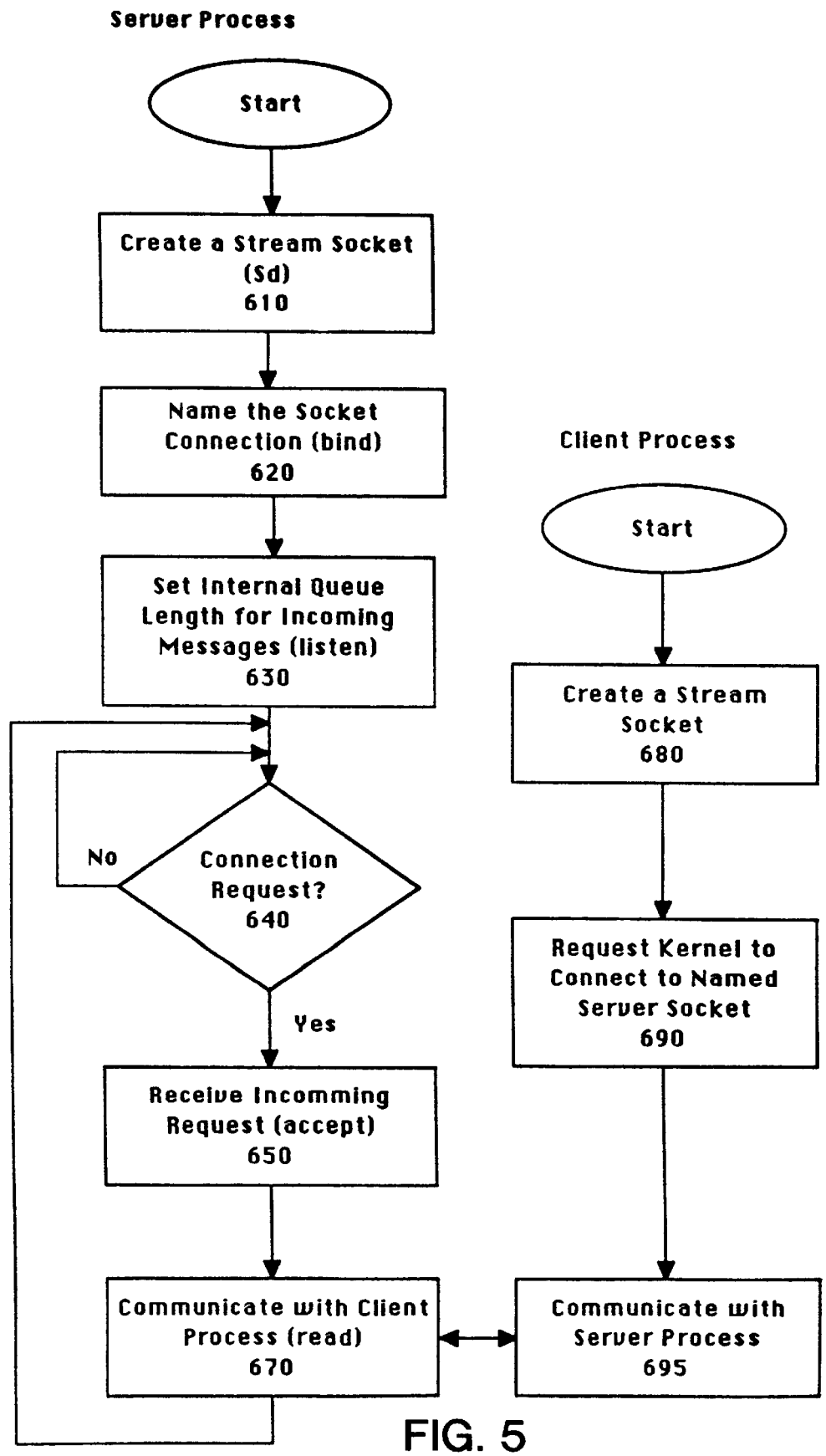
FIG. 5 is a flow chart to illustrate interprocessor communication using sockets.

Processes may also communicate with each other via Sockets, which is also provided by the UNIX operating system. A Socket system call establishes one end point of a communications link. An exemplary flow chart description of interprocess communication in the UNIX operating system is shown in FIG. 5. Before the processes can communicate with each other, they must set up the communications link. Referring to FIG. 5, to communicate, the server process creates a stream Socket 610, names the Socket connection 620, sets internal queue length for incoming messages 630, and checks for any connection requests from client processes 640. A connection request indicates a process' desire to communicate. If there is a request, the server process receives the incoming request 650 and communicates with the client process 670. The client process prepares for communication by creating a stream Socket 680, requests the Kernel to connect to the named server Socket, and communicates with the server process.

Each process runs in its own virtual address space and memory, the operating system preventing other processes from accessing that memory region. However, the different processes may communicate with each other by sharing portions of their virtual address space, and then reading and writing the data stored in the shared memory. For further information, see Bach, *The Design of the Unix Operating System* (Prentice-Hall1986).

The communication of large amounts of data between processes is preferably achieved through the utilization of shared memory. Through the use of shared memory, for example, the first sub-program may write data into memory and the second sub-program can read the data written into the memory by the first sub-program.

Figure 6:
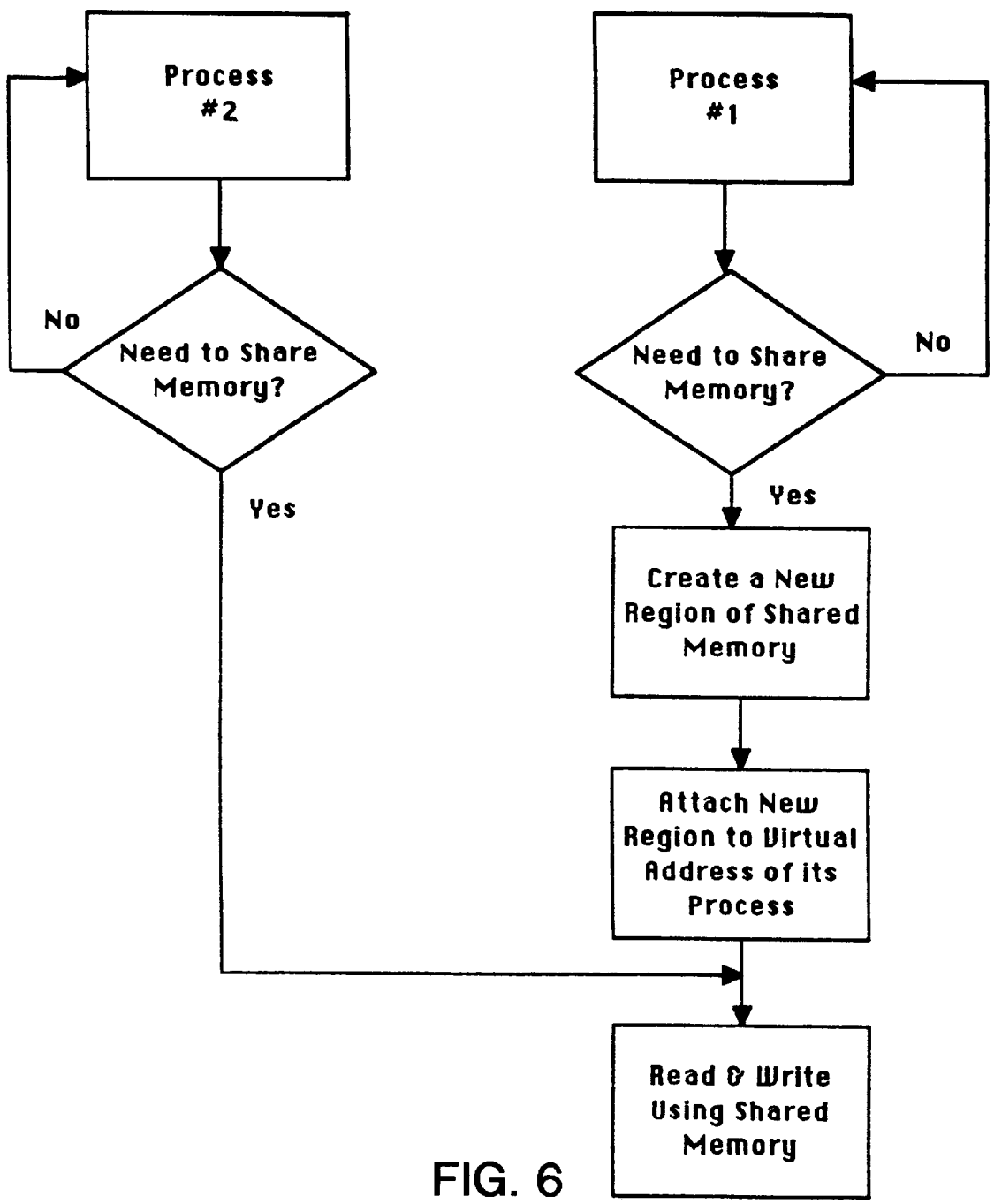
FIG. 6 is a flow chart to illustrate shared memory between processes.

Referring to FIG. 6, the first sub-program may communicate with the second sub-program by executing a system call to create a new region of shared memory, then attach that new region to the virtual address of its process. Now the two or more sub-programs may read and write using the shared memory thereby sharing the data stored in the shared memory.

The processes that share access to memory must coordinate their use of the memory to ensure functional system behavior. For example, the processes can be placed in an order hierarchy to ensure no two processes write to the shared memory location at the same time.

One method of controlling process access to shared memory is through the use of the semaphores. A process desiring to access the shared memory region must obtain access permission by successfully performing certain prescribed semaphore operations. If a semaphore is set by the process, the corresponding memory region is locked thereby preventing other processes from accessing the memory region. Semaphore implementation may be set to zero when it is set and set to one when it is free. A free (not set) semaphore indicates the memory location is available.

An example of semaphore controlling access of processes in an uniprocessor Unix system is discussed with reference to FIG. 7. However, it is evident to one skilled in the art that other methods of shared memory may be used.

Figure 7B:
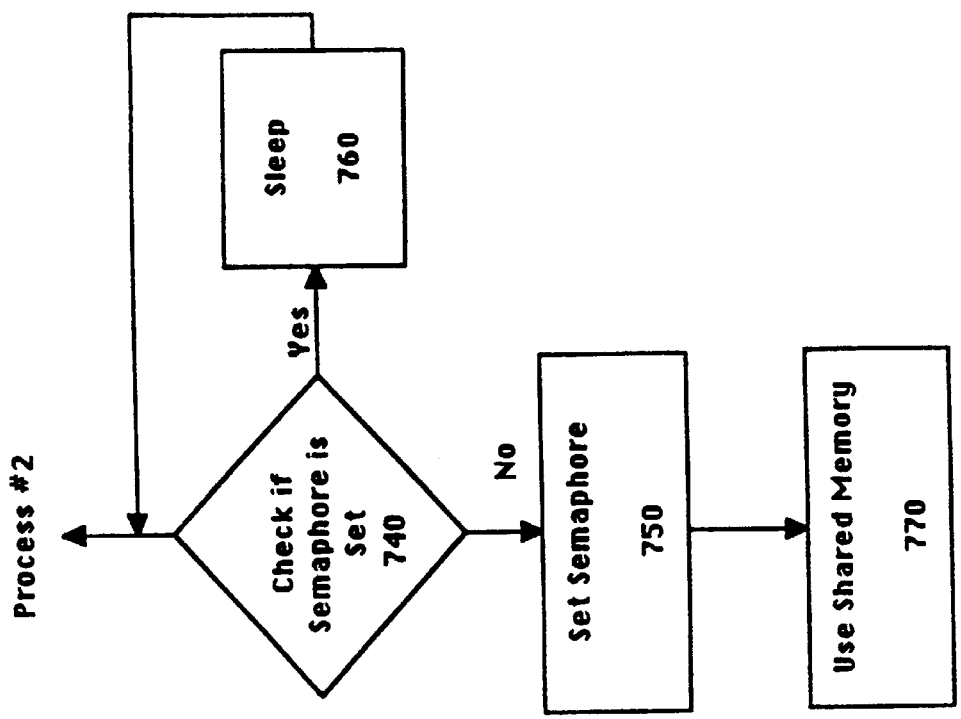
FIG. 7 is a flow chart to illustrate access control of processes using semaphores.
Figure 7A:
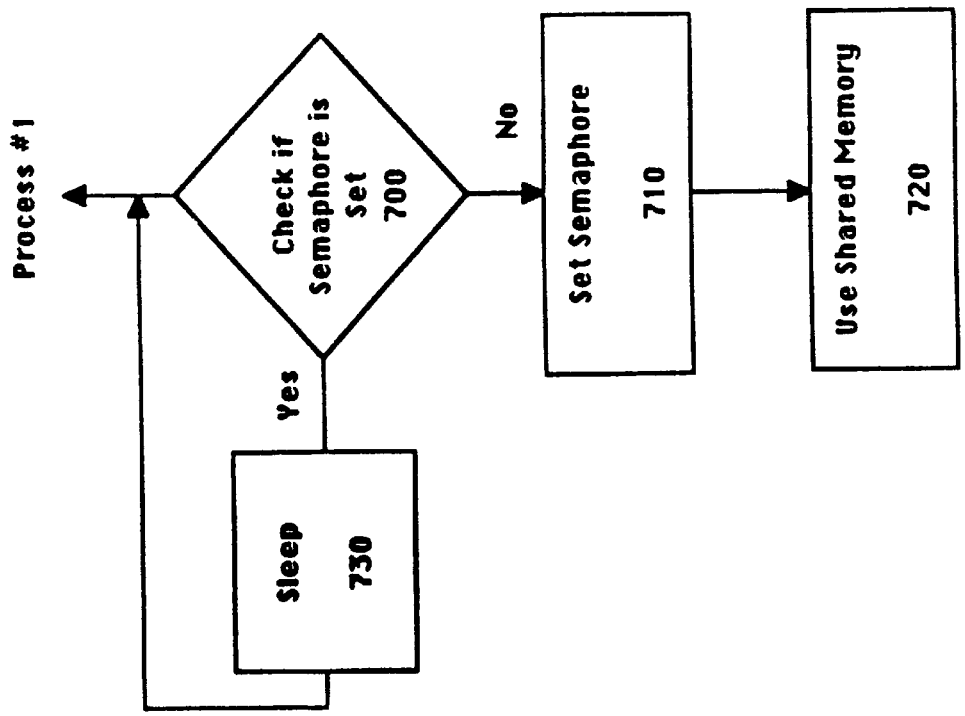

Referring to FIG. 7, the semaphore is not set initially indicating the shared memory is available. At 700, a first process checks whether semaphore is set. If semaphore is not set, the first process sets the semaphore 710 and uses the memory 720. Similarly, the second process checks whether semaphore is set 740. If semaphore is set by the first process, then the second process sleeps until semaphore is free 760. When semaphore is free, the second process sets semaphore 750 and uses the memory 770.

The shared memory mechanism may be utilized to share data. For example, the application program receives transmitted data from a modem and displays it on a window. According to the present invention, the I/O process of the first process receives the data through the modem port and writes the data into the shared memory region. While the first process writes data into the shared memory region, the semaphore is set by the first process. After the first process completes writing and releases the semaphore, the second process reads the data from the shared memory region and writes through the window system to display within the corresponding window.

Preferably, interprocess communication is achieved through the utilization of shared memory and the "Signal" system call available in the UNIX operating system. Each Signal is identified by a Signal number which identifies the process to be notified when the signal is generated. The kernel is initially informed of those Signals that may be generated and the processes which are to be notified when a Signal of a particular Signal number is generated. When a Signal is generated by a process, the kernel causes the process corresponding to the Signal number to execute a predetermine routine/procedure to service the Signal. For further information on Signals see, Bach, Maurice J., *The Design of the UNIX Operating System,* (Prentice-Hall 1986) pp. 200–212.

In the preferred embodiment of the present invention, the application program comprises two processes. The first process contains the time critical procedures and the second process contains the remaining procedures including those procedures which execute window system procedures. The processes functions in a master-slave relationship wherein the first process functions as the master and the second process functions as the slave. Shared memory is established and accessible by both processes. To initiate the application, the user executes a command to initiate execution of the first process. The first process executes start-up code to configure the application and then spawns the second process. For example, the first process may initialize the interprocess communication mechanism or may set up a section of shared memory. During execution of the application program, when a procedure in the second process is to be executed, for example when a window-system procedure is to be performed, the first process places a command in shared memory which identifies the procedure to be executed and any parameters needed to execute the procedure. The first process then issues a Signal having a predetermined signal number which indicates that the second process is to read the shared memory and execute the command stored in shared memory. While the second process is executing the first process continues in its execution whereby the first process is unaffected by the window system procedures and any suspension of processes which may occur during the execution of the window system procedure. The first process periodically polls shared memory looking for information that may be returned by the procedure executed by the second process. If any information is found in shared memory, the first process simply extracts the information. Thus, the first process further insulates itself from the second process while maintaining full bi-directional communications to transparently operate as a single application program to the user.

Through the separation of the application program into a process containing time critical procedures and a process containing window system interface specific procedures and blocking procedures, the time critical procedures are isolated from those procedures which can cause time critical procedures to be suspended while the processes execute in conjunction with one another and communicate with one another through interprocess communications and appear to the user as a single application program.

While the invention has been described in conjunction with the preferred embodiment, it is evident that numerous alternatives, modifications, variations, and uses will be apparent to those skilled in the art in light of the foregoing description.

What is claimed is:

1. In a computer system comprising a CPU, a window system, and an operating system, said computer system operating in accordance with said operating system and said window system, a method for operating an application program in said computer system, said method comprising the steps of:

dividing said application program into a first process and a second process;
    said first process comprising at least one time critical procedure within said application program, said time critical procedure requiring execution within a limited time in order to execute properly;
    said second process comprising no time critical procedures;
executing said first process and second process of said application program in said computer system operating in accordance with said operating system and said window system such that:
    said first process bypasses said window system and communicates directly with said operating system such that said window system is unable to suspend said first process;
    said second process communicates directly with said window system such that said window system is able to selectively suspend said second process;
said first process communicates directly with said second process through an interprocess communication mechanism;
wherein said first process and said second process operate in conjunction with one another to accomplish said application program such that division of said application program into said first process and said second process is transparent to a user of said computer system.

2. The method for operating an application program in said computer as provided in claim 1, wherein said interprocess communication mechanism comprises shared memory.

3. The method for operating an application program in said computer as provided in claim 2, wherein said interprocess communication mechanism utilizes semaphores in conjunction with said shared memory.

4. The method for operating an application program in said computer as provided in claim 1, wherein said interprocess communication mechanism includes said operating system operating a message queue in which interprocess messages are stored.

5. The method for operating an application program in said computer as provided in claim 1, wherein said operating system comprises UNIX® and said interprocess communication mechanism comprises "Sockets."

6. The method for operating an application program in said computer as provided in claim 1, wherein said at least one procedure within said application program which requires a predetermined response time in order to execute properly comprises at least one procedure which emulates hardware.

7. The method for operating an application program in said computer as provided in claim 1, wherein said at least one procedure within said application program which requires a predetermined response time in order to execute properly comprises at least one procedure which emulates a disk drive controller.

8. The method for operating an application program in said computer as provided in claim 1, wherein said at least one procedure within said application program which requires a predetermined response time in order to execute properly comprises at least one procedure which emulates an interrupt controller.

9. The method for operating an application program in said computer as provided in claim 1, wherein said at least one procedure within said application program which requires a predetermined response time in order to execute properly comprises at least one procedure which emulates a keyboard controller.

10. The method for operating an application program in said computer as provided in claim 1, wherein said at least one procedure within said application program which requires a predetermined response time in order to execute properly comprises at least one procedure which emulates a serial I/O interface.

11. In a computer system comprising a CPU, a window system, and an operating system, said computer system operating in accordance with said operating system and said window system, a method for operating an application program in said computer system, said method comprising the steps of:

dividing said application program into a first process and a second process;
    said first process comprising at least one time critical procedure within said application program, said time critical procedure requiring execution within a limited time in order to execute properly;
    said second process comprising no time critical procedures;
initiating the execution of said first process in said computer system operating in accordance with said operating system and said window system, said first process bypassing said window system and communicating directly with said operating system such that said window system is unable to suspend said first process;

said first process executing start-up code to configure said application program;

said first process setting up a section of shared memory for interprocess communication with second process;

said first process placing a command in said shared memory, said command identifying a particular procedure to be executed by said second process;

said first process issuing a signal to said second process, said single causing said second process read said command placed in said shared memory;

said second process executing said command, said second process communicating directly with said window system such that said window system is able to selectively suspend said second process;

wherein said first process and the second process operate in conjunction with one another in master/slave relationship to accomplish said application program.

12. The method for operating an application program in said computer as provided in claim 11, wherein said at least one procedure within said application program which requires a predetermined response time in order to execute properly comprises at least one procedure which emulates hardware.

13. The method for operating an application program in said computer as provided in claim 11, wherein said at least one procedure within said application program which requires a predetermined response time in order to execute properly comprises at least one procedure which emulates a disk drive controller.

14. The method for operating an application program in said computer as provided in claim 11, wherein said at least one procedure within said application program which requires a predetermined response time in order to execute properly comprises at least one procedure which emulates an interrupt controller.

15. The method for operating an application program in said computer as provided in claim 11, wherein said at least one procedure within said application program which requires a predetermined response time in order to execute properly comprises at least one procedure which emulates a keyboard controller.

16. The method for operating an application program in said computer as provided in claim 11, wherein said at least one procedure within said application program which requires a predetermined response time in order to execute properly comprises at least one procedure which emulates a serial I/O interface.

* * * * *